United States Patent [19]

Mathis et al.

[11] 3,843,595

[45] Oct. 22, 1974

[54] ULTRAVIOLET LIGHT STABILIZER COMBINATIONS FOR POLYMERS

[75] Inventors: Ronald D. Mathis, Taylors; James S. Dix, Greenville, both of S.C.

[73] Assignee: Phillips Petroleum Company, Bartlesville, Okla.

[22] Filed: Sept. 6, 1972

[21] Appl. No.: 286,697

[52] U.S. Cl................. 260/45.75 N, 260/45.75 R, 260/45.85 B
[51] Int. Cl........................................ C08 45/58
[58] Field of Search............ 260/45.75 R, 45.75 N, 260/45.85 B

[56] References Cited
UNITED STATES PATENTS

| | | | |
|---|---|---|---|
| 3,112,338 | 11/1963 | Smutny et al................... | 260/45.85 |
| 3,206,431 | 9/1965 | Doyle et al...................... | 260/45.85 |
| 3,245,923 | 4/1966 | Manzella et al................. | 260/45.75 |
| 3,318,841 | 5/1967 | Tomlinson....................... | 260/45.75 |
| 3,424,716 | 1/1969 | Noshay et al................... | 260/45.75 |
| 3,454,521 | 7/1969 | Tholstrup........................ | 260/45.85 |

*Primary Examiner*—V. P. Hoke

[57] ABSTRACT

Ultraviolet light stabilizer combinations for polymeric materials are described which comprise mixtures of at least two components selected from nickel dithiocarbamates, zinc dithiocarbamates, and hydroxy-substituted phenyl benzoates. A preferred embodiment includes the use of the stabilizer mixtures as ultraviolet light stabilizers for polypropylene.

18 Claims, No Drawings

ULTRAVIOLET LIGHT STABILIZER COMBINATIONS FOR POLYMERS

This invention relates to combinations of ultraviolet light stabilizers and polymer compositions containing said combinations.

Various organic stabilizing substances are known to improve the ultraviolet light stability of polymeric materials. Prior art has disclosed the use of nickel dithiocarbamates, zinc dithiocarbamates, and hydroxy-substituted phenylbenzoates singly to improve the ultraviolet light stability of polymeric compositions. Heretofore, however, none of the prior art disclosures have suggested the use of combinations of nickel dithiocarbamates, zinc dithiocarbamates, and hydroxy-substituted phenylbenzoates to improve the ultraviolet light stability of polymeric materials. More particularly, prior art teachings have not demonstrated the unexpected results obtained by the use of the aforesaid combinations wherein the combined effect of two of the ultraviolet light stabilizing components is greater than the effect obtained when either is employed separately for a similar purpose.

It is an object of this invention to provide ultraviolet light stabilizer combinations for polymeric materials. Another object is to provide ultraviolet light stabilized polymer compositions. Still another object is to provide economic and suitable methods for the preparation of ultraviolet light stabilized polymer compositions. These and other objects will be readily apparent from the written description and the appended claims.

In accordance with this invention, ultraviolet light stabilizer combinations comprising at least two components selected from the group consisting of, as a first component a nickel dithiocarbamate, as a second component a zinc dithiocarbamate, and as a third component a hydroxy-substituted phenyl benzoate, are provided. An additional embodiment of this invention provides for ultraviolet light stable polymer compositions containing at least two of the aforesaid components.

The first component nickel dithiocarbamates that can be employed in the practice of this invention include compounds represented by the formula

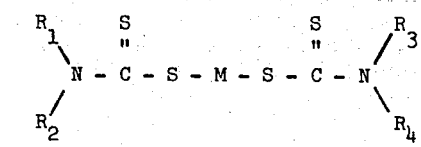

wherein M represents nickel, each $R_1$, $R_2$, $R_3$, and $R_4$ group independently represents an acyclic hydrocarbon radical having up to 20 carbon atoms or a cyclic hydrocarbon radical having up to 20 carbon atoms. Particularly preferred acyclic and cyclic radicals are aliphatic, alicyclic or aromatic hydrocarbon radicals and combinations thereof having up to 10 carbon atoms. Representative of nickel dithiocarbamates that can be employed are: nickel dipropyldithiocarbamate, nickel dibutyldithiocarbamate, nickel dihexyldithiocarbamate, nickel dioctyldithiocarbamate, nickel dilauryldithiocarbamate, nickel distearyldithiocarbamate, nickel dibenzyldithiocarbamate, nickel dicyclohexyldithiocarbamate, nickel dicyclopentyldithiocarbamate, nickel diphenyldithiocarbamate, and nickel dinaphthyldithiocarbamate, and the like and mixtures thereof.

The second component zinc dithiocarbamates that can be employed in the practice of this invention include compounds represented by the formula set out hereinbefore wherein M represents zinc and each $R_1$, $R_2$, $R_3$, and $R_4$ group is as defined hereinbefore. Representative of zinc dithiocarbamates that can be employed are: zinc dipropyldithiocarbamate, zinc dibutyldithiocarbamate, zinc dihexyldithiocarbamate, zinc dioctyldithiocarbamate, zinc dilauryldithiocarbamate, zinc distearyldithiocarbamate, zinc dibenzyldithiocarbamate, zinc dicyclohexyldithiocarbamate, zinc dicyclopentyldithiocarbamate, zinc diphenyldithiocarbamate, and zinc dinaphthyldithiocarbamate, and the like and mixtures thereof.

The third component hydroxy-substituted phenyl benzoates that can be employed in the practice of this invention include compounds represented by the formula

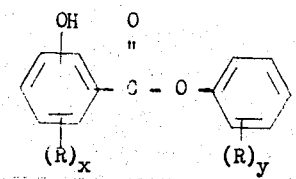

wherein each R group independently represents halogens, an acyclic hydrocarbon or hydrocarbyloxy radical having up to 20 carbon atoms or a cyclic hydrocarbon or hydrocarbyloxy radical having up to 20 carbon atoms, x is an integer having a value of from 0 to 4, and y is an integer having a value of from 0 to 4. Particularly preferred acyclic and cyclic radicals are aliphatic, alicyclic, aromatic hydrocarbyl or hydrocarbyloxy radicals and combinations thereof having up to 10 carbon atoms. Representative of hydroxy-substituted phenyl benzoates that can be employed are: phenyl 4-hydroxybenzoate; 2',4'-di-t-butylphenyl 3,5-di-t-butyl-4-hydroxybenzoate; 2',4'-dicyclooctylphenyl 3,5-dicyclooctyl-4-hydroxybenzoate; 2',4'-dioctadecylphenyl 3,5-dipentadecyl-4-hydroxybenzoate; 2',4'-di(2,2-dimethylpentyl)phenyl 3,5-di(2,2-dimethylpentyl)-4-hydroxybenzoate; 4'-octylphenyl 3,5-di-t-butyl-4-hydroxybenzoate; 3',5'-dilaurylphenyl 3,5-di-t-octyl-4-hydroxybenzoate; 2'-t-butylphenyl 3,5-di(2,2-diethylbutyl)-4-hydroxybenzoate; 2'-chloro-4'-octylphenyl 3,5-di-t-butyl-4-hydroxybenzoate; p-bromophenyl 3,5-di-t-butyl-4-hydroxybenzoate; p-bromophenyl 3,5-di-t-butyl-4-hydroxybenzoate; o-phenylphenyl 3,5-di-t-butyl-4-hydroxybenzoate; p-phenylphenyl 3,5-di-t-butyl-4-hydroxybenzoate; p-methoxyphenyl 3,5-di-t-butyl-4-hydroxybenzoate; phenyl 3,5-di-t-butyl-4-hydroxybenzoate; 4'-phenoxyphenyl 3,5-di-t-butyl-4-hydroxybenzoate; 4'-cyclopropoxyphenyl 3,5-di-octyl-4-hydroxybenzoate; 4'-octadecylphenyl 3,5-di-t-amyl-4-hydroxybenzoate; 4'-dodecylphenyl 2-n-decyl-4-hydroxybenzoate; p-octylphenyl salicylate; p-hexadecylphenyl salicylate and mixtures thereof.

The polymeric materials that can be employed in the practice of this invention are normally solid polymers derived from unsaturated monomers including homopolymers, copolymers, blends of a variety of at least two polymers selected from homopolymers or copolymers including polymers of aliphatic 1-olefins (polyolefins); poly(vinyl-substituted aromatic compounds) such as polystyrene; poly(vinyl halides) such as poly(vinyl chloride); poly(vinyl acetate); and the like. Said polymers are advantageously stabilized by the use of a stabilizer combination containing at least two members of the group comprising nickel dithiocarbamates, zinc dithiocarbamates and hydroxy-substituted phenyl benzoates. Preferred polymers in the practice of this invention include homopolymers and copolymers derived from 1-monoolefins having from 2 to 8 carbon atoms. In most instances, the presently preferred polymers are ethylene or propylene homopolymers, or are copolymers of ethylene or propylene with minor amounts of another monomer copolymerizible therewith such as propylene or ethylene, butene-1, hexene-1, octene-1, and the like. Polymers wherein at least 50 mol per cent is derived from polymerization of ethylene or propylene monomeric units are preferred. Even more preferred are polymeric materials wherein at least 90 mol per cent of the polymer is derived from ethylene or propylene monomer units. Of even more importance are propylene polymers wherein at least 90 mol per cent of the polymer is derived from propylene and from about 0.5 to 10 mol per cent of the polymer is derived from a comonomer selected from ethylene, butene-1, pentene-1, or hexene-1, since such polymers are preferably employed in the manufacture of ultraviolet light stabilized fibers and films.

The stabilizer components set out hereinbefore can be incorporated in polymers in any suitable manner. In general, each component is incorporated in individual amounts of from about 0.05 part to about 2.5 parts by weight, preferably about 0.1 part to about 1 part by weight, per 100 parts of polymer by weight. The weight ratio of the respective components with respect to each other can vary over a wide range in both a two-component and a three-component system. In general, in a two component system the weight ratios of the respective components can vary over a wide range, but in general will be in the range of from about 10:1 to about 1:10, preferably in the range of from about 4:1 to about 1:4, and more preferably in the range of about 1.5:1 to about 1:1.5. In general, in a three component system the weight ratios of the respective components can vary over a wide range, but in general will be in the range of from about 10:10:1 to about 1:1:10, from 10:1:1 to about 1:10:10, and from about 10:1:10 to about 1:10:1, preferably in the range of from about 4:4:1 to about 1:1:4, from 4:1:1 to about 1:4:4, from 4:1:4 to about 1:4:1, and more preferably in the range of from about 1.5:1.5:1 to about 1:1:1.5, from about 1.5:1:1 to about 1:1.5:1.5, from about 1.5:1:1.5 to about 1:1.5:1.

In the preparation of the ultraviolet light stabilizer polymer compositions suitable methods of preparation comprise admixing the stabilizer components in conventional polymer process equipment for a sufficient period of time and at an adequate temperature to intimately combine the polymer with the ultraviolet light stabilizing components to obtain at least substantially uniform dispersion of the ultraviolet light stabilizing components in the polymer. Suitable methods of incorporation include dry blending with polymer powders or pellets in tumble mixers, Henschel mixers and the like. Alternatively, polymer and stabilizer components can be admixed in screw extruders, Banbury mixers, Brabender mixers, roll mills, and the like, in order to blend the stabilizers with molten polymer or polymer admixtures. Alternatively, the stabilizer components can be sprayed on the polymer powder from a solution or dispersion in acetone, methanol, cyclohexane, aromatic hydrocarbons such as benzene, and the like, prior to pelletizing of the polymeric compositions. In general, when a solvent is employed, it is usually removed by evaporation prior to final processing of the polymeric composition into its final form.

In addition, conventional additives such as fillers, pigments, plasticizers, thermal stabilizers, antioxidants, lubricating and processing additives such as fatty acid salts of stearic acid, e.g., calcium stearate, can be incorporated during admixture of the ultraviolet light stabilizing components of this invention with the polymeric materials in accordance with the methods described hereinbefore.

Set out hereafter is an example in further illustration of the invention which is not to be considered as unduly limitative thereof.

EXAMPLE I

Stabilizer components nickel dibutyldithiocarbamate, designated hereinafter as A, zinc dibutyldithiocarbamate, hereinafter designated as B, and 2',4'-di-t-butylphenyl 3,5-di-t-butyl-4-hydroxybenzoate, hereinafter referred to as C, were added individually or in combination to polypropylene having a nominal melt flow value of about 3. In each evaluation the same polypropylene was employed which, in combination with the stabilizer components added thereto for ultraviolet light stability, was formed into films having a thickness of 5 mils which were subsequently exposed in an Atlas twin enclosed carbon arc Weather-O-Meter operated without the water-spray cycle and modified by the incorporation therein of eight fluorescent sun lamps. Samples were tested for failure every 20 hours by subjecting each film strip to a rolling motion such that the entire length of the film strip was bent approximately 180°. The samples failed when the film strips broke. The results of the tests were as follows:

TABLE I

| Stabilizer | Amount, php* | | | Actual Hours to Failure | Expected Hours to Failure** |
| | A | B | C | | |
| --- | --- | --- | --- | --- | --- |
| None | — | — | — | 80 | — |
| A | 0.45 | — | — | 480 | — |
| B | — | 0.45 | — | 100 | — |
| C | — | — | 0.45 | 467 | — |
| A and B | 0.225 | 0.225 | — | 387 | 290 |
| A and C | 0.225 | — | 0.225 | 767 | 474 |
| B and C | — | 0.225 | 0.225 | 347 | 284 |
| A and B and C | 0.15 | 0.15 | 0.15 | 527 | 349 |
| A and B and C | 0.05 | 0.25 | 0.15 | 427 | 265 |
| A and C | 0.30 | — | 0.15 | 740 | 518 |
| A and C | 0.15 | — | 0.30 | 700 | 482 |

*Parts of stabilizer by weight per 100 parts of polypropylene by weight.
**"Expected Hours to Failure" are based on the individual stabilizer component hours to failure values being directly proportional to the amount of stabilizer component employed in the combination.

The polypropylene samples employed contained 0.02 part per 100 parts of octadecyl[3-(3,5-di-t-butyl-4-hydroxyphenyl)] propionate as an antioxidant for the purpose of stabilizing the polymer against oxidative degradation primarily during extrusion of the blend and not for the purpose of facilitating the operability or efficacy of the ultraviolet light stabilizing component combinations of this invention.

As indicated by the above data, it is readily apparent that ultraviolet light stabilizing combinations of A and B, A and C, B and C, and A, B and C produce stabilized polymer compositions having greater ultraviolet light stability than would be expected. In addition, variations in the proportions of stabilizing components indicates that the improved efficacy of the combination of stabilizer packages is achieved over a wide range of proportions of the components employed.

With respect to the antioxidant employed in the ultraviolet light stabilized polymers of this invention, other well-known types of antioxidants commonly employed with polymeric materials, such as tetrakis[methylene(3,5-di-t-butyl-4-hydroxyhydrocinnamate)]methane, 2,6-di-t-butyl-4-methylphenol, di-n-octadecyl(3,5-di-t-di-butyl-4-hydroxybenzyl)phosphonate, can be used in lieu of or in combination with the aforesaid antioxidants without deleteriously affecting the efficacy of the ultraviolet stabilizer combinations of this invention.

Further modifications of the teachings of this invention in the use of nickel dibutyldithiocarbamates, zinc dithiocarbamates, and hydroxy-substituted phenyl benzoates to impart improved ultraviolet light stability to polymeric materials will be apparent to those skilled in the art.

What is claimed is:

1. A composition of matter useful as a stabilizer for polymers which comprises a mixture of at least one nickel dithiocarbamate represented by the formula

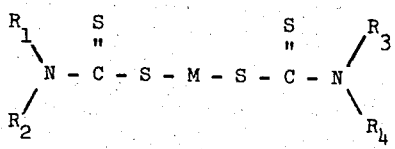

wherein M represents nickel, each $R_1$, $R_2$, $R_3$, and $R_4$ group independently represents an acyclic hydrocarbon radical having up to 20 carbon atoms or a cyclic hydrocarbon radical having up to 20 carbon atoms; and at least one hydroxy-substituted phenyl benzoate represented by the formula

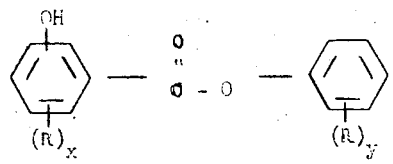

wherein each R group independently represents halogen, an acyclic hydrocarbyl or hydrocarbyloxy radical having up to 20 carbon atoms or a cyclic hydrocaryl or hydrocarbyloxy radical having up to 20 carbon atoms, $x$ is an integer having a value of from 0 to 4, and $y$ is an integer having a value of from 0 to 4, the ratio by weight of said at least one nickel dithiocarbamate to said at least one phenyl benzoate being within the range of from about 10:1 to about 1:10.

2. A composition in accord with claim 1, wherein said at least one nickel dithiocarbamate is nickel dibutyldithiocarbamate.

3. A composition in accord with claim 1, wherein said at least one hydroxy-substituted phenyl benzoate is 2',4'-di-t-butylphenyl 3,5-di-t-butyl-4-hydroxybenzoate.

4. A composition in accord with claim 1 wherein said at least one nickel dithiocarbamate is nickel dibutyldithiocarbamate and wherein said at least one hydroxy-substituted phenyl benzoate is 2',4'-di-t-butylphenyl 3,5-di-t-butyl-4-hydroxybenzoate.

5. A composition in accordance with claim 1 additionally comprising at least one zinc dithiocarbamate represented by the formula

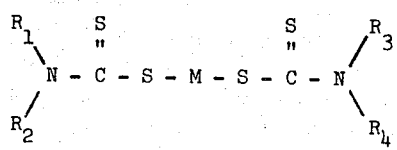

wherein M represents zinc and each $R_1$, $R_2$, $R_3$, and $R_4$ group independently represents an acyclic hydrocarbon radical having up to 20 carbon atoms or a cyclic hydrocarbon radical having up to 20 carbon atoms; the ratio by weight of said at least on zinc dithiocarbamate to said phenyl benzoate being within the range of from about 10:1 to about 1:10 and the ratio by weight of said zinc dithiocarbamate to said nickel dithiocarbamate being within the range of from about 10:1 to about 1:10.

6. A composition in accord with claim 5 wherein said at least one zinc dithiocarbamate is zinc dibutyldithiocarbamate.

7. A composition in accordance with claim 5, wherein said at least one nickel dithiocarbamate is nickel dibutyldithiocarbamate.

8. A composition in accordance with claim 5, wherein said at least one phenyl benzoate is 2',4'-di-t-butylphenyl 3,5-di-t-4-hydroxybenzoate.

9. A composition in accordance with claim 5, wherein the ratio by weight of said at least one nickel dithiocarbamate to said at least one phenyl benzoate is within the range of from about 4:1 to about 1:4, wherein the ratio by weight of said at least one nickel dithiocarbamate to said at least one zinc dithiocarbamate is within the range of from about 4:1 to about 1:4, and wherein the ratio by weight of said at least one phenyl benzoate to said at least one zinc dithiocarbamate is within the range of from about 4:1 to about 1:4.

10. A composition comprising polyolefin and a mixture of at least one nickel dithiocarbamate represented by the formula

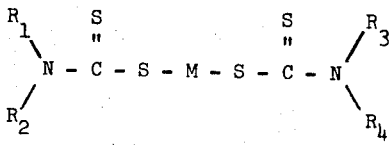

wherein M represents nickel, each $R_1$, $R_2$, $R_3$, and $R_4$ group independently represents an acyclic hydrocarbon radical having up to 20 carbon atoms or a cyclic hydrocarbon radical having up to 20 carbon atoms; and at least one phenyl benzoate represented by the formula

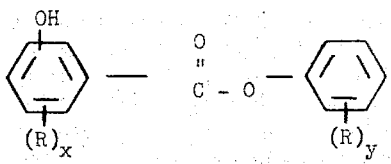

wherein each R group independently represents halogen, an acyclic hydrocarbyl or hydrocarbyloxy radical having up to 20 carbon atoms or a cyclic hydrocarbyl or hydrocarbyloxy radical having up to 20 carbon atoms, x is an integer having a value of from 0 to 4, and y is an integer having a value of from 0 to 4, wherein said at least one nickel dithiocarbamate and said at least one phenyl benzoate are each present in an amount in the range of from about 0.05 part to about 2.5 parts by weight per 100 parts by weight of said polyolefin.

11. A composition in accordance with claim 10, wherein said mixture comprises a mixture of nickel dibutyldithiocarbamate and 2',4'-di-t-butylphenyl 3,5-di-t-butyl-4-hydroxybenzoate, and wherein said polyolefin is derived from the polymerization of aliphatic 1-olefins having from 2 to 8 carbon atoms.

12. A composition in accordance with claim 11 wherein said polyolefin is polypropylene.

13. A composition in accordance with claim 12 wherein said nickel dibutyldithiocarbamate and said 2',4'-di-t-butylphenyl 3,5-di-t-butyl-4-hydroxybenzoate are each present in an amount in the range of from about 0.1 part to about 1 part by weight per 100 parts by weight of said polyolefin.

14. A composition in accordance with claim 10 additionally comprising at least one zinc dithiocarbamate represented by the formula

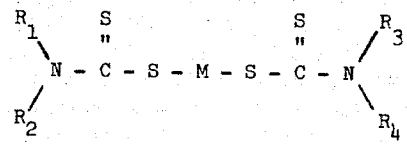

wherein M represents zinc and each $R_1$, $R_2$, $R_3$, and $R_4$ group independently represents an acyclic hydrocarbon radical having up to 20 carbon atoms or a cyclic hydrocarbon radical having up to 20 carbon atoms, said at least one zinc dithiocarbamate being present in an amount in the range of from about 0.05 part to about 2.5 parts per 100 parts by weight of said polyolefin.

15. A composition in accordance with claim 14, wherein said mixture is a mixture of nickel dibutyldithiocarbamate, zinc dibutyldithiocarbamate, and 2',4'-di-t-butylphenyl 3,5-di-t-butyl-4-hydroxybenzoate.

16. A composition in accordance with claim 15, wherein said polyolefin is derived from the polymerization of aliphatic 1-olefins having from 2 to 8 carbon atoms.

17. A composition in accordance with claim 15, wherein said polyolefin is polypropylene.

18. A composition in accordance with claim 15, wherein said nickel dibutyldithiocarbamate, said zinc dibutyldithiocarbamate, and said 2',4'-di-t-butylphenyl 3,5-di-t-butyl-4-hydroxybenzoate are each present in an amount in the range of from about 0.1 part to about 1 part by weight per 100 parts by weight of said polyolefin.

* * * * *